United States Patent [19]
Brehm et al.

[11] Patent Number: 5,183,489
[45] Date of Patent: Feb. 2, 1993

[54] METHOD OF MAKING MULTI-FERRULES HAVING A SERIES OF CHANNELS WITH PARALLEL AXES

[75] Inventors: Claude Brehm, Montrouge; Philippe Dupont, Melun; André Tardy, Egly, all of France

[73] Assignee: Alcatel Fibres Optiques, France

[21] Appl. No.: 787,832

[22] Filed: Nov. 5, 1991

[30] Foreign Application Priority Data

Nov. 8, 1990 [FR] France .................. 90 13857
Aug. 30, 1991 [FR] France .................. 91 10786

[51] Int. Cl.⁵ .................. C03B 37/027; C03B 23/20
[52] U.S. Cl. .................. 65/4.2; 65/4.21; 65/110; 385/98; 385/99
[58] Field of Search .......... 65/4.2, 4.21, 108, 110; 385/98, 99

[56] References Cited

U.S. PATENT DOCUMENTS

| | | |
|---|---|---|
| 3,654,680 | 4/1972 | Bode et al. |
| 3,684,468 | 8/1972 | Bode et al. ............ 65/108 X |
| 3,740,561 | 6/1973 | Fleck et al. |
| 4,822,389 | 4/1989 | Berkey ................ 65/4.2 |

FOREIGN PATENT DOCUMENTS

0259877 9/1987 Fed. Rep. of Germany .
0283301 3/1988 United Kingdom .

OTHER PUBLICATIONS

Patent Abstracts of Japan, vol. 10, No. 225, Aug. 6, 1986, "Optical Connector of Multi-core".
"High Performance Push-Pull Coupling Single Fiber Connectors and Plug-In Fiber-Optic Connectors" Review of Electrical Communications Laboratories, Sep. 1987, No. 5, pp. 529–533.

*Primary Examiner*—Robert L. Lindsay
*Attorney, Agent, or Firm*—Sughrue, Mion, Zinn, Macpeak & Seas

[57] ABSTRACT

The invention relates to a method of making multi-ferrules. It provides a method of making multi-ferrules from a vitreous material, the multi-ferrules having a series of cylindrical channels with parallel axes. The method is characterized in that it comprises the following steps:

forming a blank (1) of well-defined section from a vitreous material, in which cylindrical passages (2) having parallel axes and an inside diameter Di have been machined, the dimensions of the outside section of the blank and the diameter Di being defined with relative accuracies at least equal to the accuracies required respectively for the dimensions of the outside section of the multi-ferrule (11) to be made and the inside diameter of the channels (9) of said multi-ferrule, positioning this blank (1) vertically in an apparatus of the same type as a fiber drawing apparatus for optical fibers, exerting traction on the piece (6) being formed at the bottom end of said blank (1) in such a manner as to obtain the required outside dimensions, controlling the dimensions of the outside section of the piece (6) being formed, and forming a multi-ferrule (11) of selected length by cutting a given length from the piece (6) obtained as indicated above.

18 Claims, 6 Drawing Sheets

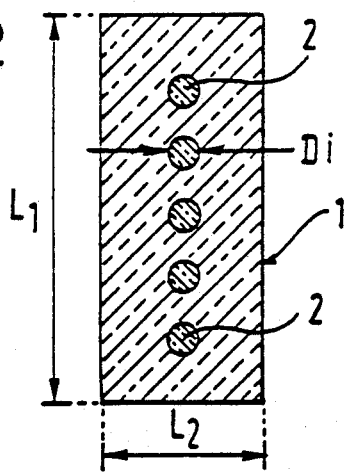
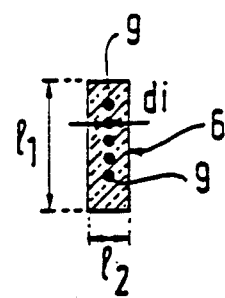
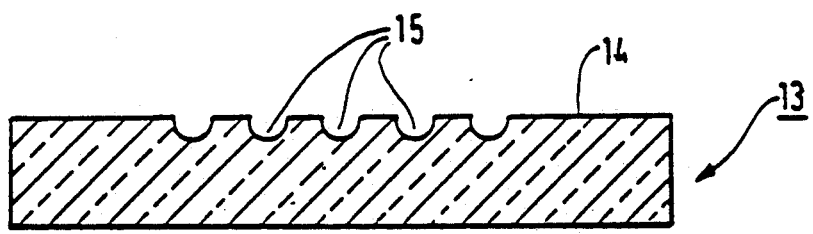
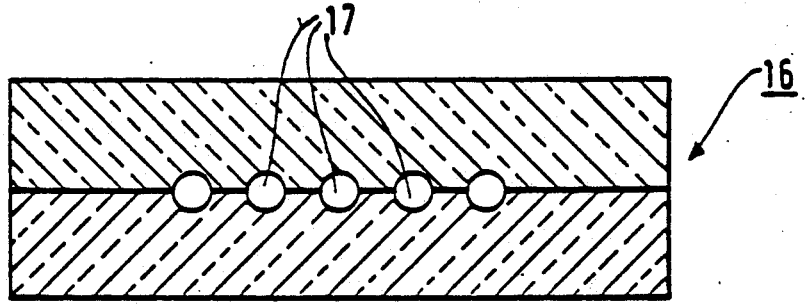
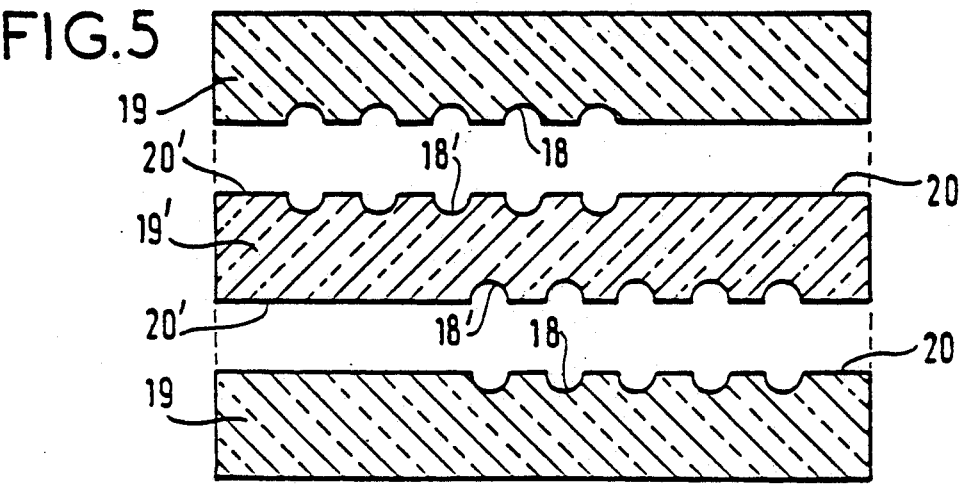

METHOD OF MAKING MULTI-FERRULES HAVING A SERIES OF CHANNELS WITH PARALLEL AXES

The present invention relates to a method of making multi-ferrules; these multi-ferrules are adapted to connect one assembly of optical fibers to another or to an optical waveguide module.

The connection of optical fibers, for telecommunications for example, requires their ends to be guided with great accuracy of alignment. The latest generations of cables comprise sets of optical fibers arranged for example in ribbons of 5 to 10 fibers (called multi-fiber ribbons). To connect two of these sets of fibers together without welding one to the other, it is possible to use a guide piece having a series of sized channels with parallel axes, called a "multi-ferrule", in which the two sets of fibers to be connected are engaged.

In the prior art, these multi-ferrules are customarily made individually from machined ceramic. They are available in the form of small ceramic plates in which channels, e.g. cylindrical channels, have been machined with parallel axes and with a diameter substantially equal to that of the fibers, one channel per fiber. The values of these diameters are verified by passing a wire of the required diameter through each channel. Having regard to the accuracy required (typically the diameter of an optical fiber is 125 microns and that of the channels 127 microns) and the number of channels to be machined to obtain a multi-ferrule, the method of machining ceramics is complex and thus very costly.

Methods are moreover known from U.S. Pat. Nos. 3,654,680 and 3,740,561 enabling manufacture of pieces of a vitreous material having a plurality of channels with parallel axes. According to those methods, one starts from a starting piece formed by an assembly of tubular pieces, each having a passage. This starting piece is then drawn while being heated, after securing the tubular pieces to one another, in order to obtain a final piece of the required dimensions.

However, in such an assembly of tubular pieces the accuracy with which the channels are positioned relative to one another is poor, on account of the cumulative positioning errors of the tubular pieces relative to one another.

An object of the present invention is to provide a method of manufacture which is less complex and less costly than the prior art, for making multi-ferrules whose dimensions are highly accurate.

The present invention accordingly provides a method of making multi-ferrules from a vitreous material, the multi-ferrules having a series of cylindrical channels with parallel axes, characterized in that the method comprises the following steps:

forming a blank of well-defined section from a vitreous material, with cylindrical passages having parallel axes and an inside diameter Di, the dimensions of the outside section of the blank and the diameter Di being defined with relative accuracies at least equal to the accuracies required respectively for the dimensions of the outside section of the multi-ferrule to be made and for the inside diameter of said channels of said multi-ferrule, said multi-ferrule being adapted to be heated and simultaneously drawn until the required outside dimensions are obtained, positioning said blank vertically in an apparatus of the same type as a fiber drawing apparatus for optical fibers, exerting traction on the piece being formed at the bottom end of said blank, and forming a multi-ferrule of selected length by cutting a given length from the piece obtained as indicated above.

According to other characteristics of the method, the blank positioned vertically in the fiber-drawing apparatus of the same type as a fiber-drawing apparatus may be heated at its bottom end to a temperature less than the fiber-formation temperature of the vitreous material, so as to avoid deformation during drawing; furthermore, the vitreous material may be selected from pure silica glass or any other multi-component glass based on silica, such as crown, flint, boro-silicate or soda-silicate glass. When the selected vitreous material is pure silica, the heating temperature is 2000° C.±50° C.

According to a further characteristic, the speed of drawing can be controlled in the range 1 meter per minute (m/min) to 20 m/min.

Advantageously, a gas may be introduced into the passages in such a manner as to establish a pressure in the range 270 Pa to 2700 Pa relative to ambient pressure within the channels of said piece being formed. The introduced gas may be air or nitrogen.

In another variant of the method, control of the outside dimensions of said piece being formed may be effected by measuring one of the dimensions of the outside section of said piece.

According to an important improvement of the method according to the invention, the initial blank may be formed in the following manner:

at least two pieces of a vitreous material, called "pre-blanks", are machined, each having at least one flat face such that assembling a flat face of any of said pre-blanks against a flat face of another of said pre-blanks forms a piece with an outside surface like that of said blank, at least one groove is machined in at least one of said flat faces, said groove(s) extending over the whole length of said faces, and said pre-blanks are assembled in such a manner as to form said blank and said passages.

The blanks obtained in this way are longer than those obtained by machining cylindrical channels in a block of vitreous material, e.g. by drilling. In fact the length of blanks obtained in that way is limited to around 250 mm, because the length of the drill making the bore is limited on account of its small diameter (around 3.2 mm, corresponding to the desired initial diameter of the passages). That limitation in length prevents the manufacture of large numbers of multi-ferrules from a single blank.

Moreover, the passages are more accurate and easier to make then with the drilling method, because it is well known that it is generally difficult to maintain the cylindrical shape of passages formed in this way, so that the passages very often exhibit a slight taper. This slight taper can in practice be the cause of increased attenuation of optical signals transmitted through the multi-ferrules. Furthermore, to bore a plurality of passages in a blank, a single drill is used and the piece to be drilled is turned in the opposite sense to that in which the drill rotates, in such a manner that the very thin drill does not deviate from its intended path, which requires the blank to be shifted for each drilling, in order to make the passage on the axis of rotation of the drill. A special and complex mounting thus has to be provided. Even if they improve the quality of the passages, such arrangements again lead to poor parallelism between their axes.

Advantageously, after machining the groove or grooves, the machined flat faces are so ground as to render the depth of the groove or grooves uniform over the whole length thereof. This grinding allows the grooves to be corrected when they are too deep or when their depth varies from one end of the pre-blank to the other.

In order to keep the pre-blanks assembled with each other for installation in a drawing apparatus, collars made of a vitreous material similar to that of the pre-blanks may be fitted around the pre-blanks at the ends of the blank thus formed.

The machined grooves are semicircular in cross-section.

In one possible embodiment, each of the flat faces adapted to be assembled against another flat face has at least one groove. In this case, the pre-blanks are for example so assembled that the groove or grooves of one face coincide with those machined in the face assembled thereagainst in such a manner as to form the passage or passages of the blank.

In another embodiment, the pre-blanks are so assembled that the groove or grooves of one of the faces coincides or coincide with a non-machined flat part of the face assembled thereagainst.

The manufactured blanks may be cylindrical and made from two identical pre-blanks of semicircular cross-section. The blank may equally be in the form of a rectangular block and be made up from the two rectangular pre-blanks.

Furthermore, the blank may include guide channels on its outside surface running parallel to the passages and extending over its whole length.

It is thus possible, in the method of the invention or one or more of its variants, to form multi-ferrules including guide grooves corresponding to those of the blank and parallel to the channels.

The channels of the multi-ferrules are advantageously cylindrical and may have a flared form at at least one of the end faces of said multi-ferrules.

The multi-ferrules thus obtained may be used for example to correct one set of optical fibers to another or to connect a set of optical fibers to an optical waveguide module, the connection being permanent or releasable.

In one possible use of a multi-ferrule obtained in the preceding manner, the optical fibers of two sets are introduced into and bonded inside the channels of said multi-ferrule to ensure a permanent connection. This bonding may be effected with a liquid adhesive which can be polymerized by heating with ultraviolet radiation for example. This bonding is called "UV bonding" below.

In another preferred use, the optical fibers of one set can be introduced into the channels of said multi-ferrule, in such a manner that said optical fibers are flush with the face opposite their entrance end, said face being adapted to be polished, to ensure a connection that is permanent or releasable. The permanent connection may be made by UV bonding.

Connection of a ribbon of optical fibers to a waveguide module is facilitated by use of a multi-ferrule of the invention, which allows UV bonding and facilitates positioning fibers relative to waveguides, this positioned being effected fiber-by-fiber in the prior art.

Features and advantages of the present invention as well as uses of multi-ferrules obtained by the invention appear in the course of the following description of a method of making a multi-ferrule and of uses of the resulting multi-ferrules, given by way of non-limiting example.

BRIEF DESCRIPTION OF THE DRAWINGS

FIGS. 2 and 3 show sections on lines II—II and III—III in FIG. 1, FIG. 4A is a cross section of a pre-blank for making a multi-ferrule blank with a row of cylindrical passages with parallel axes, FIG. 4B is a cross section of the multi-ferrule blank obtained from two pre-blanks like that of FIG. 4A, FIG. 5 is a cross section of three pre-blanks for making a multi-ferrule blank having two rows of cylindrical passages with parallel axes.

In the following figures common elements have the same reference numerals.

In FIG. 1 a glass blank 1 in the form of a plate of rectangular section (length L1, width L2), in which a series of cylindrical passages 2 (of diameter di) have been machined, with parallel axes (see FIG. 2), is positioned vertically and is held by a retaining member 3 associated with a mechanism 4 allowing the blank 1 to be lowered progressively during manufacture.

Figure 1:
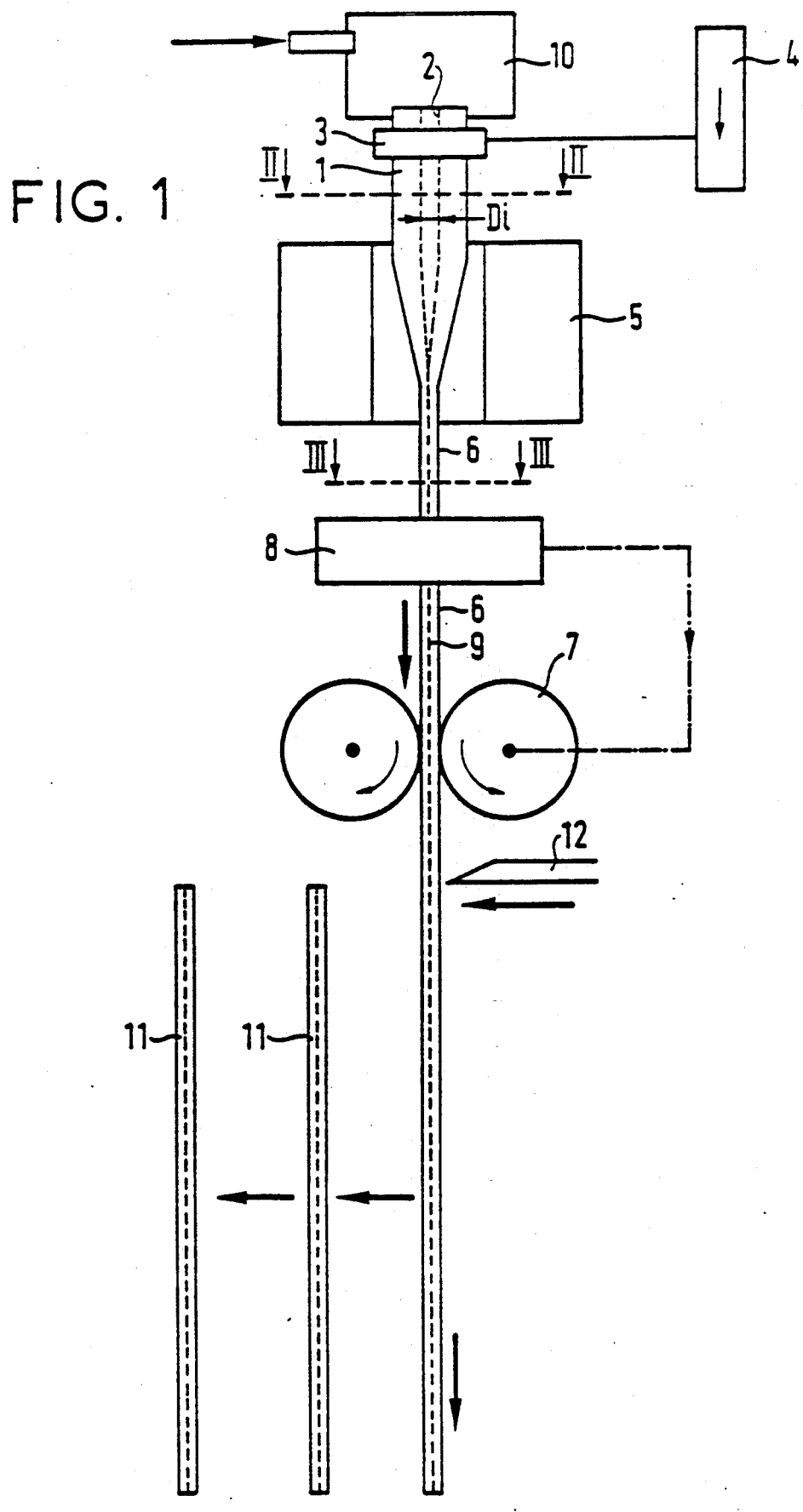
FIG. 1 shows the functional layout of a possible method of manufacture of the invention.

The blank 1 is fed into a furnace 5 where the temperature is regulated to stay below the fiber-formation temperature of the material. For a pure silica glass, the temperature employed in the method of the invention will be in the order of 2000° C.±50° C.

The piece 6 which is formed by reducing the dimensions of the blank is drawn by a roller type mechanical drawing device 7, operating in a straight line. The tractive force is slaved to one of the dimensions (length 11 or width 12) of the current outside section of the piece 6 being formed (see FIG. 3), which is measured periodically or continuously by a measuring device 8. It suffices to measure one of the characteristic dimensions of the current outside section of the piece 6 being formed (length 11 or width 12), because the scale factor (here L2/12 or L1/11) is the same for all characteristic dimensions (inside or outside) of the piece being formed, as well as for the tolerances associated with these dimensions. However, this piece must be so guided as to ensure that there are no twisting movements, as is so when rollers 7 are used with an appropriate drawing speed, which may be up to 20 m/min.

It is possible to introduce a low excess pressure inside the channels 9 of the piece 6 being formed, by means of a gas injected into a manifold 10 on top of the blank. The pressure will typically be in the range 270 Pa to 2700 Pa and is easy to regulate in accordance with the leakage rate arising from the openings of the channels 9.

The choice of gas is not critical; it suffices to select a gas which is neutral to glass, and it may be air or nitrogen for example.

However it is possible to dispense with this excess pressure by drawing at sufficiently low temperatures, at which contraction and deformation after cooling are less significant and in particular do not affect the inside diameter and the parallelism of the channels 9.

Starting with a blank 1 having the following dimensions:

inside diameter Di of the cylindrical passages 2: 3.175 mm with a minus tolerance of zero and a plus tolerance of 0.1 mm, length L1 of the outside section: 62.5 mm±0.5 mm,
width L2 of the outside section: 19 mm±0.5 mm,
spacing between the passages 2: 6.25 mm,
height: 250 mm,
a piece 6 is obtained with the following dimensions:
  inside diameter Di of the channels 9: 0.127 mm with a minus tolerance of zero and a plus tolerance of 0.004 mm,
  length 11 of the outside section: 2.5 mm±0.002 mm,
  width 12 of the outside section: 0.76 mm±0.002 mm,
  spacing between the channels 9: 0.25 mm
  height: 150 mm.

With greater accuracy in the machining of the blank 1, and starting with a blank 1 having the following dimensions:
  inside diameter Di of the cylindrical passages 2: 3.175 mm with a minus tolerance of zero and a plus tolerance of 0.025 mm,
  length L1 of the outside section: 62.5 mm±0.012 mm,
  width L2 of the outside section: 19 mm±0.012 mm,
  spacing between the passages 2: 6.25 mm,
  height: 250 mm,
a piece 6 is obtained with the following dimensions:
  inside diameter Di of the channels 9: 0.127 mm with a minus tolerance of zero and a plus tolerance of 0.001 mm,
  length 11 of the outside section: 2.5 mm±0.0005 mm,
  width 12 of the outside section: 0.76 mm±0.0005 mm,
  spacing between the channels 9: 0.25 mm
  height: 150 mm.

When the reduction ratio, L2/12 for example, is 25, as in the two examples given above, starting from a blank 1 of height 250 mm it is possible to obtain a piece 6 of length 250×25×25=156250 mm, namely around 150 m. This allows 15,000 multi-ferrules 11 of length 10 mm to be prepared, or 7,500 multi-ferrules 11 of length 20 mm, for example.

Accordingly, the method of the invention combines the accuracy required for optical connection use with a big saving in the cost of making multi-ferrules.

The blanks 1 of the multi-ferrules of the invention can be made for example by drilling cylindrical channels in a block of vitreous material. However, to obtain multi-ferrules of better quality, it is preferable to make the blanks in a different way, still starting from a block of vitreous material in which the passages are obtained by removal of material.

A method of making blanks 1 will now be described in detail with reference to FIGS. 4A, 4B and 5.

A rectangular pre-blank 13 of vitreous material is shown in FIG. 4A.

In FIG. 4B, each of the two pre-blanks shown are like that of FIG. 4A and each has a flat face 14, which flat faces come into contact with each other to form the desired blank.

Once these faces 14 have been rendered flat to within a hundredth of a millimeter, by polishing using successive disks whose surfaces are covered with abrasive particles (such as tungsten carbide, diamond paste or alumina for example) that become successively finer as the polishing proceeds, or by any other method known to the person skilled in the art, a diamond tool is used to form parallel flutes or grooves 15 therein of semicircular section over the whole length of the two pre-blanks. The maximum depth of these grooves is equal to the radius of the cylindrical passages which are required in the final blank. The grooves each have a depth of 1.587 mm with a plus tolerance of 0.002 mm for example, allowing passages to be obtained of diameter 3.175 mm with a plus tolerance of 0.004 mm. Once these grooves have been made, the two respective flat faces of the two half-blanks are put together to make up the desired blank, referenced 16 in FIG. 4B. This blank 16 then comprises equidistant passages 17 with parallel axes.

The parallelism between the axes of the passages 17 is markedly better than that of blanks formed by drilling. For a 350 mm long blank made in accordance with the invention, the observed deviation of the axis relative to the theoretical desired position is some tens of microns. For blanks of the same length obtained by drilling, the observed deviation is some hundreds of microns.

Moreover, since a drill of length limited by its thickness is no longer used, the length of the grooves and hence the length of the blanks depends only on the capacity of the machine tool, which is easily greater than the limit length previously obtained (around 250 mm). The length of the blanks made in this way can reach around 350 mm in practice.

Moreover, forming the grooves in the pre-blanks does not require the use of complex and costly devices, In fact, given that it is not necessary to feed a drill into a glass blank, which implies rotation of the blank about itself, the pre-blank may be fixed on a support and the tool for forming the grooves may be displaced for example by a stepper motor in order to make the grooves one alongside the other and with their axes parallel.

Furthermore, tapering of the passages is not observed.

In addition a correction may advantageously be effected in the case in which the machined grooves are too deep or are of varying depth from one end of the other of the half-blank. To regain the desired dimension it is sufficient to grind the face with the grooves in such a manner as to reduce the depth to obtain the desired dimension.

Multi-ferrule blanks may thus be made with as many passages as are needed for their use. It is also possible to make the passages 18 in the faces 20 of two pre-blanks 19 of a vitreous material that are to face respective opposite faces 20' of a pre-blank 19' each likewise having grooves 18' (see FIG. 5). Then, when assembling the three pre-blanks in accordance with the broken lines of FIG. 5 in such a manner as to make their grooves 18 and 18' coincide to form cylindrical passages, a blank is obtained with a plurality of rows of parallel passages, allowing connection of as many fibers as desired.

To use the blanks of the invention in a fiber-drawing apparatus such as shown in FIG. 1, the pre-blanks of the blank made up in this way are held at their two ends (that disposed towards the top of the fiber-drawing apparatus and the opposite end), so that the glass piece used forms a collar for keeping the pre-blanks assembled.

It will be understood that the invention is not limited to the embodiment and examples which have been described.

In particular, the section of the multi-ferrules to be made may be any shape (circular, polygonal, etc.), given defined outside dimensions. However, rectangular structures are more practical in use for stacking multi-ferrules.

Moreover, pure silica has been indicated as the preferred vitreous material to be used in the method of the invention but any other multi-component glass based on silica, such as crown, flint, boro-silicate or soda-silicate glass for example may be used.

Finally, an important improvement provides for machining a flare in the cylindrical channels at least at one of the ends of the multi-ferrule, this machining allowing easier introduction of the optical fibers into the multi-ferrule.

There follows a description of some examples of use of the preceding multi-ferrules.

Figure 6:
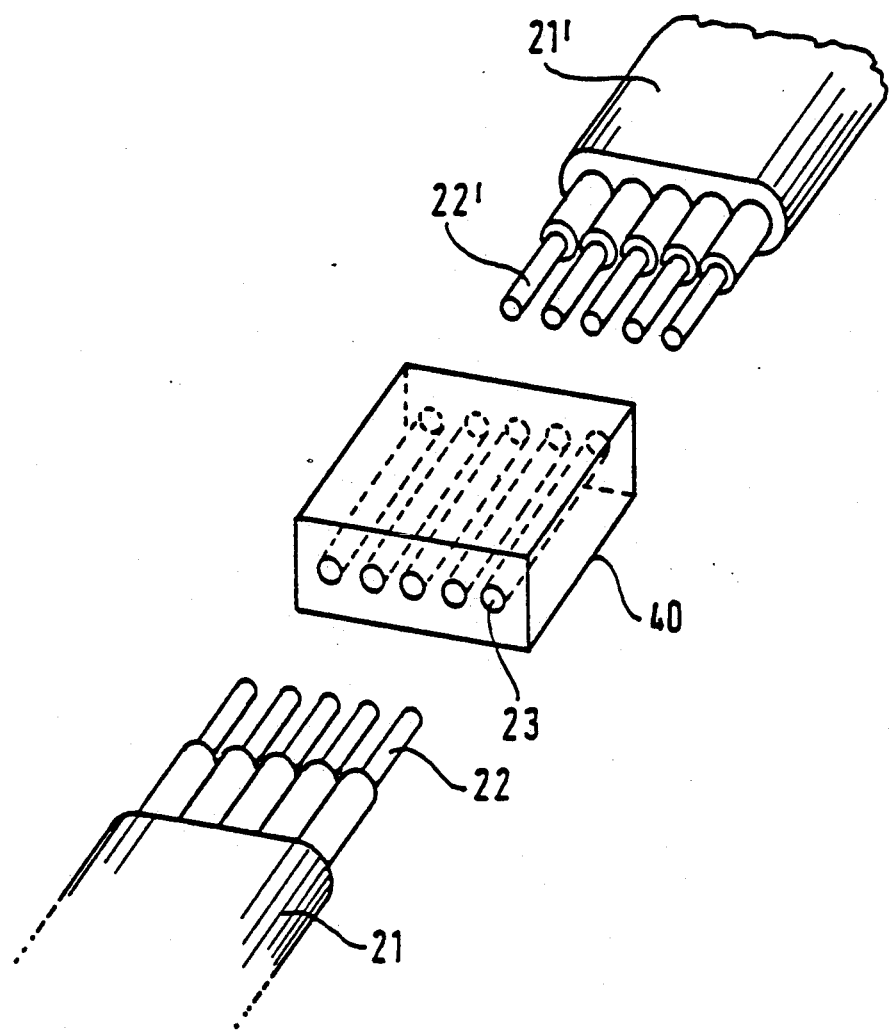
FIGS. 6 to 10 show possible uses of multi-ferrules obtained by the method of the invention.

In FIG. 6, a multi-ferrule 40 serves as a connecting piece between multi-fiber ribbons 21 and 21'. The connection is effected by means of a splice. The optical fibers 22 and 22' are engaged in the channels 23 of the multi-ferrule 40 and the connection is secured by a liquid adhesive previously introduced into the channels 23 and which is polymerized by heating (with a UV gun or otherwise) once the optical fibers have been correctly located. However conventional heating suffers from the disadvantage of altering previous adjustments of optical fiber alignment. It is thus preferable to use UV bonding. However the ceramic multi-ferrules of the prior art are not permeable to UV radiation. An additional advantage of the multi-ferrules of the invention made of a vitreous material permeable to UV radiation is that it permits UV bonding, which is more accurate and easier to implement than bonding by conventional heating. The connection obtained is then permanent.

Figure 7:
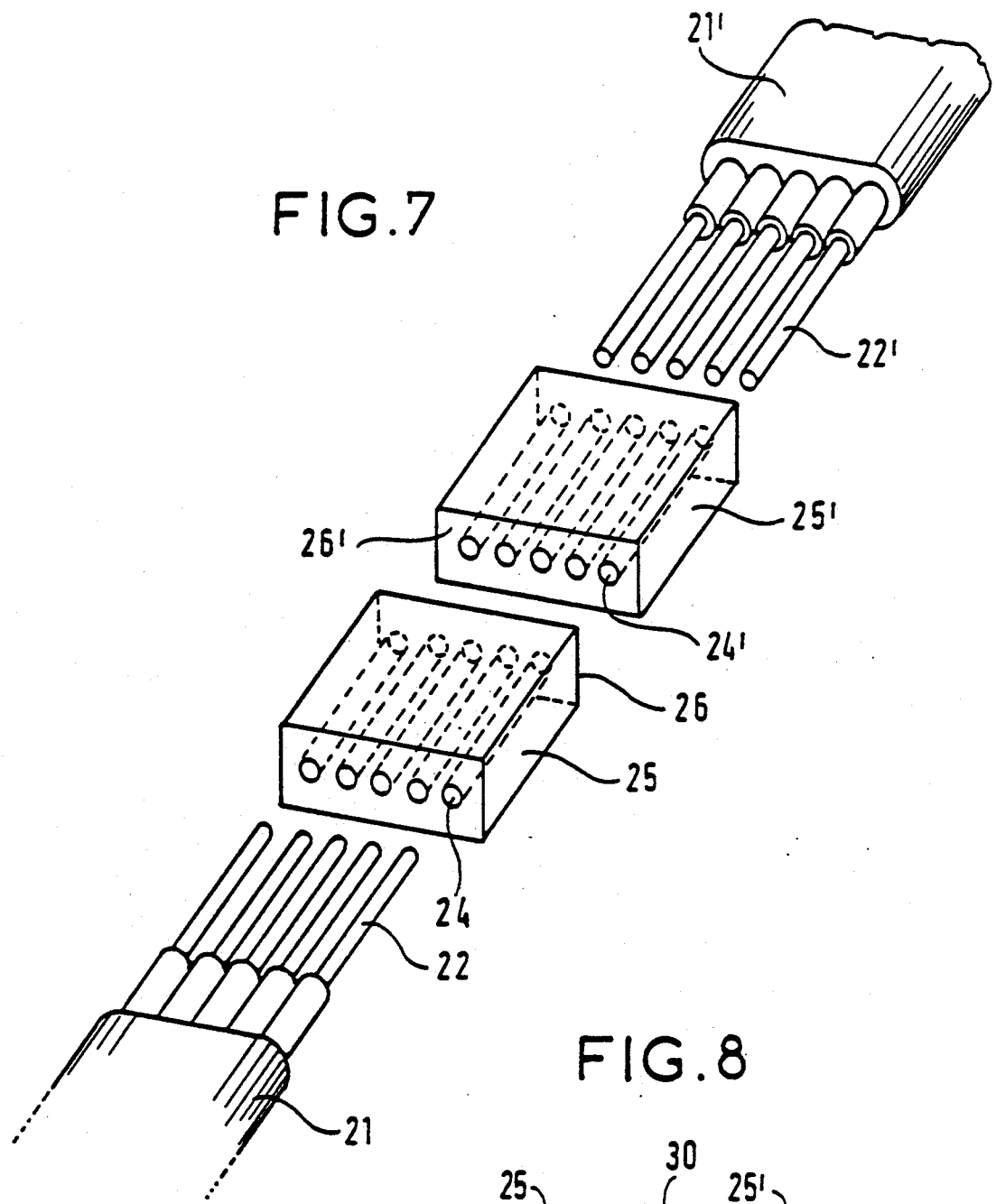

In FIG. 7 the multi-fiber ribbons 21 and 21' are respectively engaged in the channels 24 and 24' of multi-ferrules 25 and 25', in such a manner that the optical fibers 22 and 22' which they comprise are flush with the end faces 26 and 26' of the multi-ferrules 25 and 25'. The optical fibers 22 and 22' are secured by bonding as above, for example. After polishing the end faces 26 and 26', these are bonded to one another in such a way that the fibers 22 and 22' are respectively facing each other. This connection is permanent.

Figure 8:
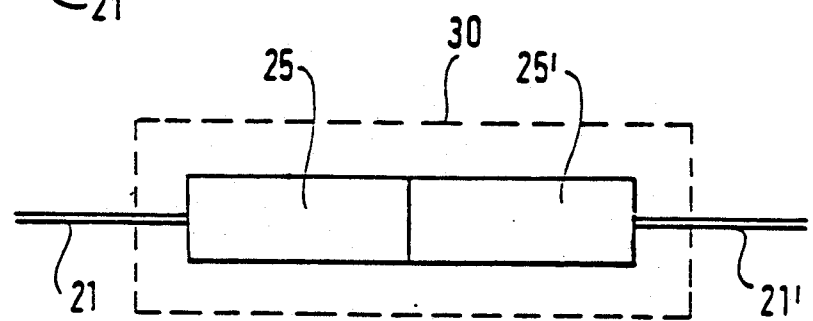
Figure 9:
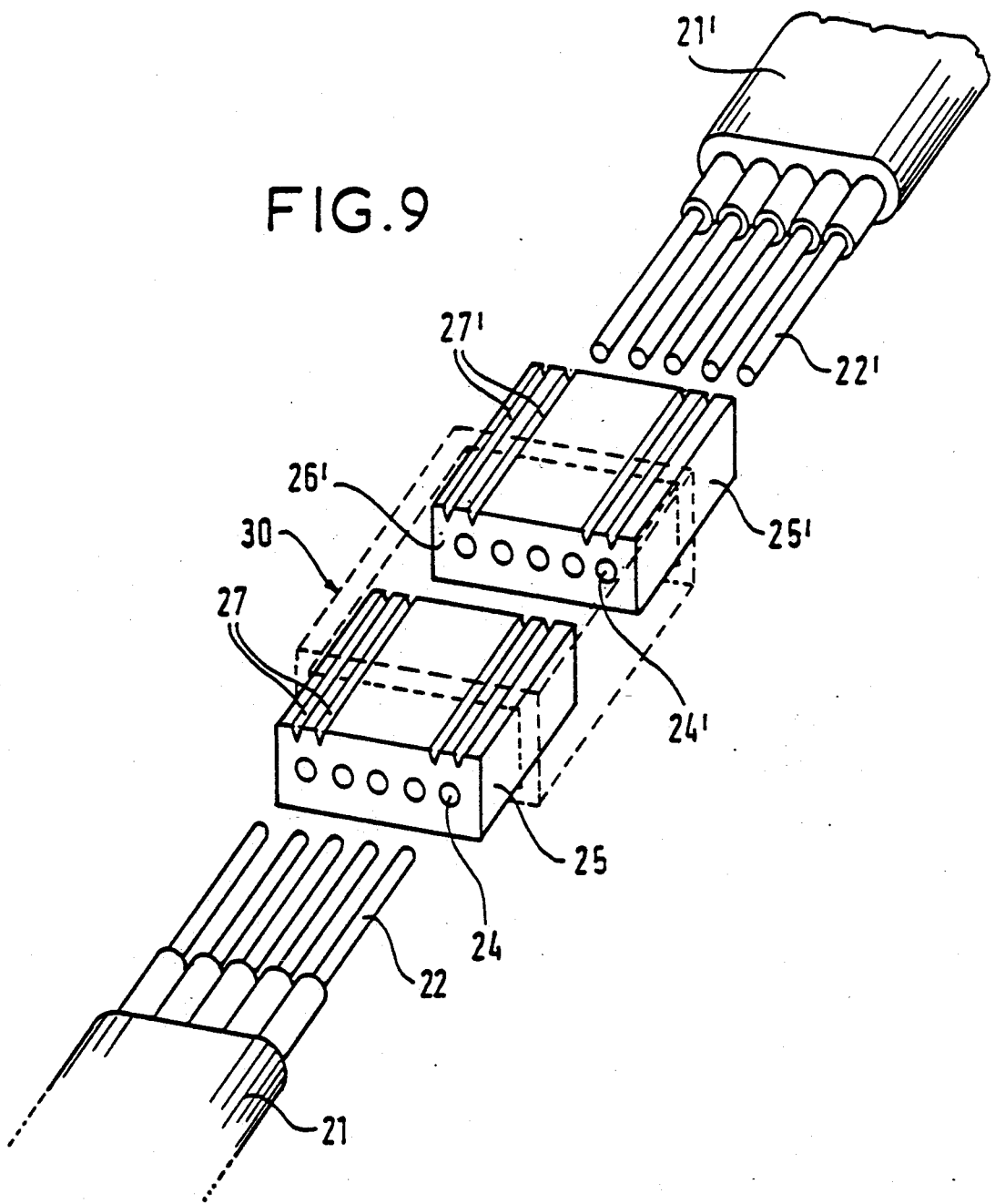

In FIGS. 8 and 9 the same elements are present as in FIG. 7, referenced with the same numbers. Here the connection is effected using a removable fixing part 30. To facilitate locating this part on the two multi-ferrules 25 and 25', it is possible to make longitudinal U or V grooves 27 and 27' (parallel to the channels), these grooves serving to guide the positioning of the fixing part 30. These grooves may correspond to grooves initially machined in the corresponding blank serving for the manufacture of the multi-ferrules. The connection is thus releasable.

Figure 10:
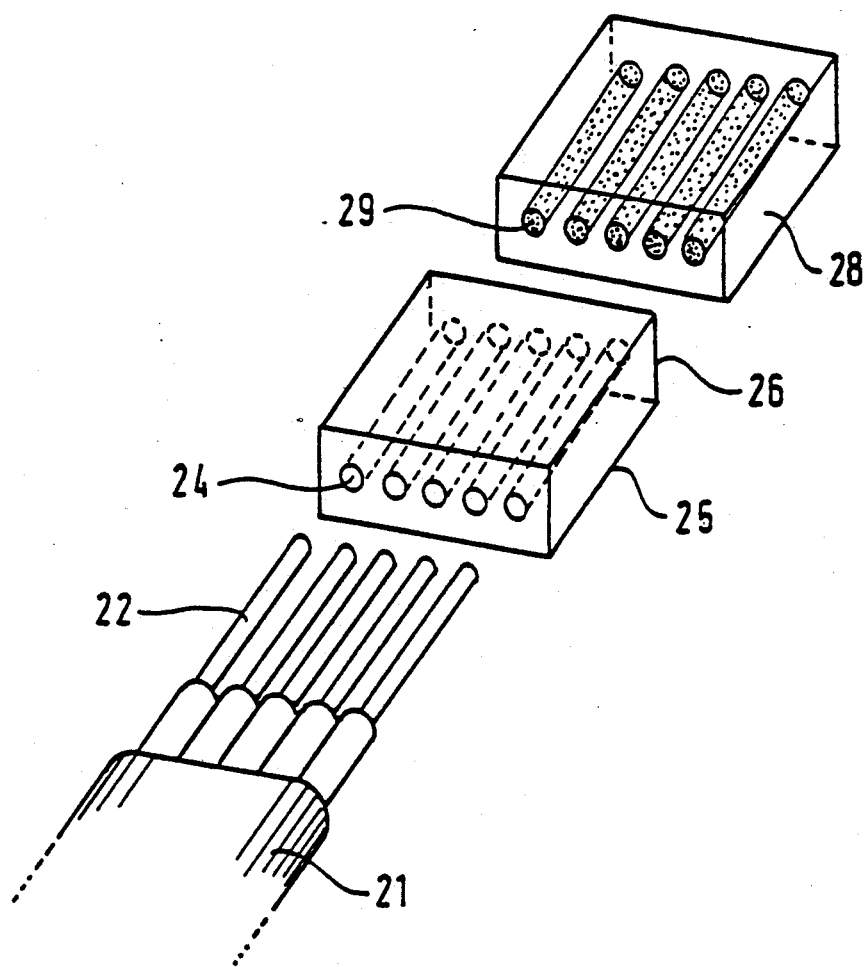

FIG. 10 concerns the connection between a multi-fiber ribbon 21 and a module 28 with optical waveguides 29 using a multi-ferrule 25. To do this, one proceeds according to the method described for the use of FIG. 7 as far as the stage of polishing the face 26.

Connection of the module 28 to the multi-ferrule 25 may be effected either by direct bonding or by a releasable attachment using a fixing part 30 analogous to that of FIGS. 8 and 9.

Clearly the invention is not limited to the embodiment which has been described and in particular any of the means may be replaced by equivalent means.

We claim:

1. A method of making multi-ferrules from a vitreous material, the multi-ferrules having a series of cylindrical channels with parallel axes, said method comprising the following steps:

forming a multi-ferrule blank of well-defined section from a solid block of vitreous material and creating within said block a plurality of spaced cylindrical passages having parallel axes and an inside diameter $D_i$, positioning said blank vertically in an apparatus similar to a fiber drawing apparatus for optical fibers, exerting traction on a piece formed at the bottom end of said blank, heating and simultaneously drawing said blank to a determined outside dimension, and forming a multi-ferrule of selected length by cutting a given length from the piece thus obtained.

2. A method according to claim 1, wherein the blank positioned vertically in the fiber-drawing apparatus is heated at its bottom end to a temperature less than the fiber-formation temperature of the vitreous material.

3. A method according to claim 1, wherein the vitreous material is one selected from the group consisting of pure silica glass, crown, flint, boro-silicate and soda-silicate glass.

4. A method according to claim 1, wherein the selected vitreous material is pure silica and for said material, the heating temperature is 2000° C. ±50° C.

5. A method according to claim 1, wherein the speed of drawing ranges from 1 m/min to 20 m/min.

6. A method according to claim 1, further comprising introducing a gas into said passages at a pressure in the range of 270 Pa to 2700 Pa relative to ambient pressure during drawing of said blank.

7. A method according to claim 6, wherein the introduced gas is one of the group consisting of air and nitrogen.

8. A method according to claim 1, wherein the outside dimensions of said piece is controlled by measuring one of the outside dimensions of a transverse section of said piece.

9. A method according to claim 1, wherein said blank is formed by:

machining at least two pre-blanks as pieces of a vitreous material, each pre-blank having at least one flat face, and assembling a flat face of one of said pre-blanks against a flat face of another of said pre-blanks to form a piece with an outside surface corresponding to said blank, machining at least one groove in at least one of said flat faces to be assembled against another of said flat faces, with said at least one groove extending over the whole length of said at least one flat face, and assembled said pre-blanks to form said blank and said passages.

10. A method according to claim 9, further comprising, after machining of said at least one groove, grinding said machined flat face to render the depth of said at least one groove uniform over the whole length thereof.

11. A method according to claim 9, further comprising, once said pre-blanks are assembled, fitting collars made of a vitreous material similar to that of said pre-blanks around said pre-blanks at the ends of said passages.

12. A method according to claim 9, wherein said grooves are of semicircular cross-section.

13. A method according to claim 9, wherein each of said flat faces assembled against another of said flat faces has at least one groove.

14. A method according to claim 13, said step of assembling said pre-blanks includes coinciding at least one groove of one of said faces with said at least one groove machined in a flat face of another of said faces assembled thereagainst to form said passages of said blank.

15. A method according to claim 9, wherein said step of assembling said pre-blanks comprises coinciding said at least one groove of one of said faces with a non-machined flat part of the face of another pre-blank assembled thereagainst.

16. A method according to claim 9, wherein said blank is cylindrical and is assembled of two identical pre-blanks of semicircular cross-section.

17. A method according to claim 9, wherein said blank is in the form of a rectangular block assembled of two rectangular pre-blanks.

18. A method according to claim 1, further comprising forming guide channels on an outside surface of said blank parallel to the passages and extending over the whole length of the blank.

* * * * *